Oct. 6, 1959                A. C. NOLTE, JR                2,907,108
                    KNIFE FOR CUTTING ENGLISH MUFFINS
Filed April 24, 1956                                    2 Sheets-Sheet 1
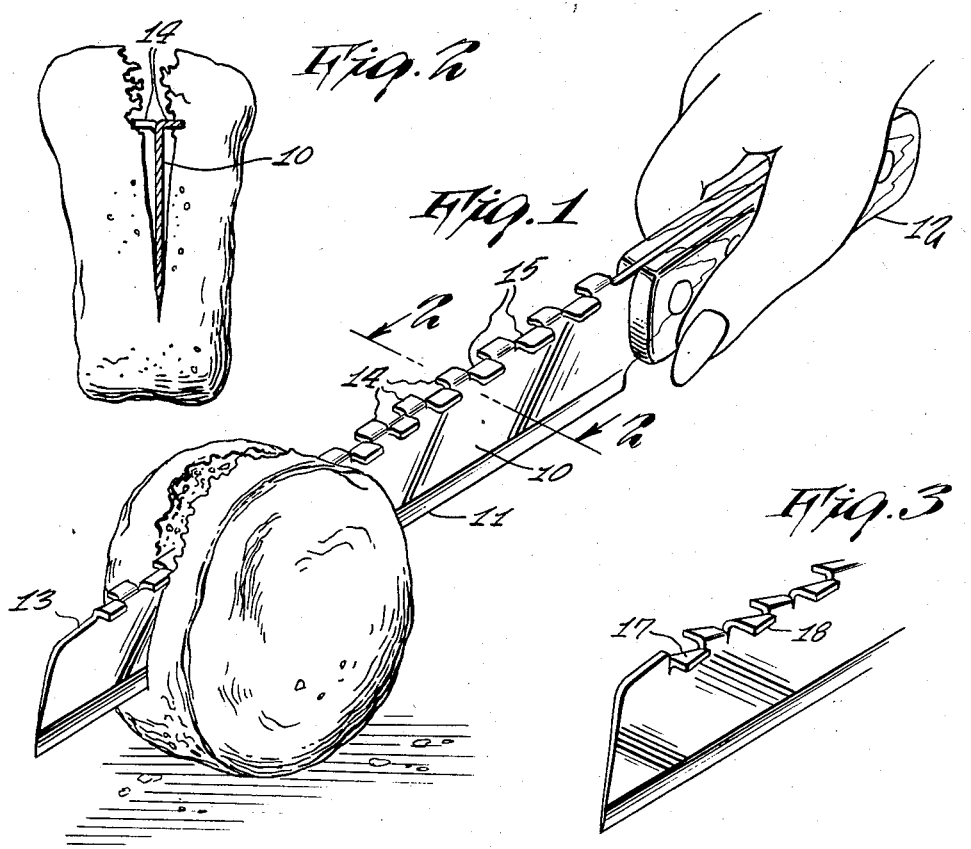
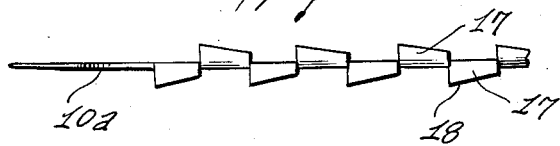
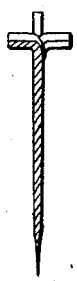
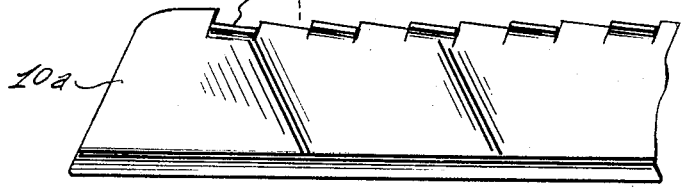
INVENTOR.
ALBERT C. NOLTE, JR.
BY
*Moses Nolte Crews & Berry*
ATTORNEYS Oct. 6, 1959  A. C. NOLTE, JR  2,907,108
KNIFE FOR CUTTING ENGLISH MUFFINS
Filed April 24, 1956  2 Sheets-Sheet 2
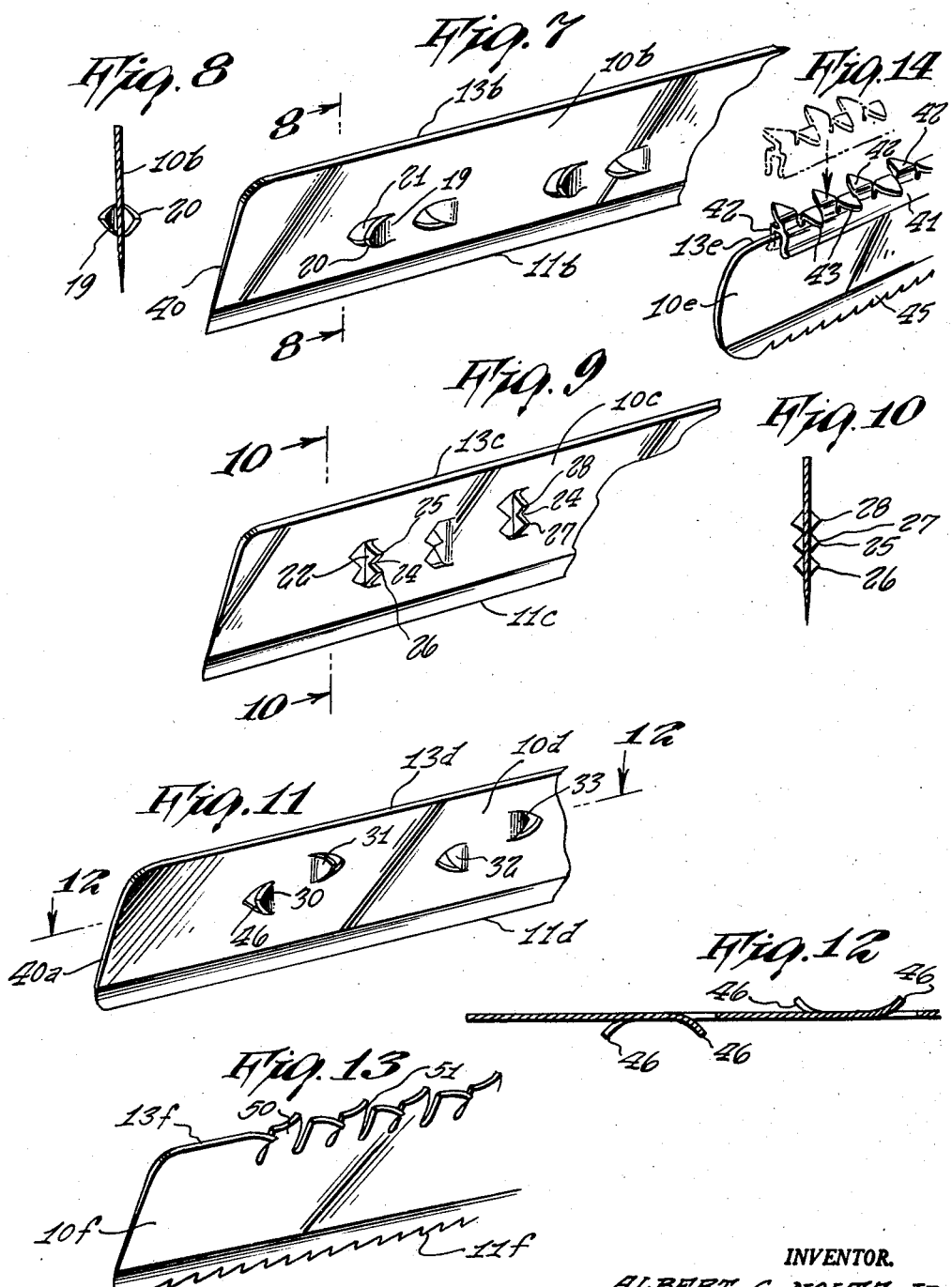
INVENTOR.
ALBERT C. NOLTE, JR.
BY

United States Patent Office 2,907,108
Patented Oct. 6, 1959

2,907,108

KNIFE FOR CUTTING ENGLISH MUFFINS

Albert Charles Nolte, Jr., East Norwich, N.Y.

Application April 24, 1956, Serial No. 580,368

5 Claims. (Cl. 30—353)

This invention relates to new and useful improvements in knives and has particular application to a knife designed to slice "English Muffins" and related bakery products.

In order that the muffin properly toast after it has been sliced in half, it is necessary that the inside portions so exposed have a rough or jagged surface.

Heretofore, this jagged surface has only been achieved by tearing the muffin by hand, or by roughing the inner surfaces of the muffin after slicing, by a fork. It is obvious that either method is unsatisfactory.

It is an object of this invention to provide a means whereby these smooth inner surfaces will be ripped to produce the desired result by a simple and inexpensive means easily adaptable to commercial manufacture.

It is a further object of this invention to provide a second cutting edge which will operate in conjunction with the usual cutting blade of a knife to produce the desired effect.

This second cutting edge operates at the same time as the usual cutting edge so that the muffin will be sliced by the first cutting edge and the inner surfaces so exposed ripped at the same time by the second cutting surface.

Other objects and advantages of my invention will become apparent during the following specification, and accompanying drawings, forming part of the specification, wherein like numerals, with distinguishing subscripts, are used to designate like parts throughout the specification and drawings:

Fig. 1 is a perspective view of the knife in use;

Fig. 2 is a sectional view along line 2—2 of Fig. 1;

Fig. 3 is a partial perspective showing a modified form of the knife;

Fig. 4 is a top view of Fig. 3;

Fig. 5 is a side view of Fig. 3;

Fig. 6 is a sectional view along line 6—6 of Fig. 5;

Fig. 7 is a partial perspective showing a modified form of the knife;

Fig. 8 is a sectional view along 8—8 of Fig. 7;

Fig. 9 is a partial perspective showing a modified form of the knife;

Fig. 10 is a sectional view along line 10—10 of Fig. 9;

Fig. 11 is a partial perspective showing a modified form of the knife;

Fig. 12 is a sectional view along line 12—12 of Fig. 11;

Fig. 13 is a partial perspective showing a modified form of the knife;

Fig. 14 is a partial perspective showing a modified form of the knife.

Referring to the drawings, the knife, as generally shown in Fig. 1, is of usual construction in that it has a handle 12, a blade 10, the blade having a cutting edge 11. The blade can be formed from metal or other suitable material.

The serrated top edge 13 of blade 10, has a series of substantially equally sized rectangular projections 14, integrally formed along its length. The projections are outwardly flanged at 15 so as to be substantially perpendicular to the blade 10. The projections 14 are alternately bent to one side and the other.

By referring to Fig. 2, it is noted that as the muffin is sliced by the cutting edge and under the pressure of the hand on the knife handle, the second cutting surface will rip the inner faces of the muffin, exposed by the slicing action, to produce the desired result.

Another embodiment of my invention is shown in Figs. 3 to 6, inclusive, wherein the substantially equally sized projections 17 are of trapezoidal form. The edges 18 of said projections are tapered inwardly toward blade 10a and also sloped downwardly toward the cutting edge 11a. The projections 17 are alternately bent to one side and the other.

Still another embodiment of my invention is shown in Figs. 7 and 8 wherein at a point, intermediate top edge 13b and cutting edge 11b, substantially equally sized projections 19 are flanged slightly outward from blade 10b. The projections taper to a point 20 in a direction toward the front edge 40 of the knife blade. This forms an unobstructed opening 21 in blade 10. Said projections 19 are alternately flanged to one side and to the other in pairs, but keeping points 20 in a common horizontal plane, so that the distance between successive pairs is greater than the distance between the projections within the pairs.

A further embodiment of my invention is shown in Figs. 9 and 10 wherein, at a point intermediate top edge 13c and cutting edge 11c, projections 22 are flanged substantially outwardly and perpendicularly to blade 10c. The projections are equidistant from each other and have a notch 24 to form teeth 25 and 26. The projections are alternately formed to one side and to the other and grouped in successive pairs so that every other pair would be disposed slightly near the top edge 13c but located so that tooth 25 would be in the same horizontal plane as tooth 27.

Still another embodiment of my invention is shown in Fig. 11 wherein at a point intermediate top edge 13d and cutting edge 11d, projections 30, 31, 32, and 33 are flanged slightly outward from blade 10. The projections are flanged in pairs. The first pair of projections, 30 and 31 closest to the edge 40a, are bent in one direction away from blade 10d. The next pair of projections, 32 and 33 are bent in the opposite direction, away from blade 10d, as the pair of projections directly preceding. The projections 31 and 33 are disposed slightly closer to top edge 13d than projections 30 and 32 but so located that projections 31 and 33 would be in the same horizontal plane. The projections are, alternately in pairs, bent to one side and the other, but formed so that the distance between pairs is greater than the distance between the projections within the pairs. All the projections are tapered to point 46.

Another embodiment of my invention is shown in Fig. 13 wherein the top edge 13f of blade 10f is serrated to form teeth 50. Successive back edges 51 of each tooth are alternately bent to one side and the other. The bottom edge 11f is also serrated.

A further embodiment is shown in Fig. 14, wherein the edge 45 is serrated, and a substantially U-shaped member 41 made of metal, plastic, or other suitable material is attached to the top edge 13c of knife blade 10e. This member 41 has a serrated top edge consisting of a series of triangular projections 42 integrally formed to the U-shaped member 41. The projections are alternately bent outward to one side and the other and tapered to a point 43.

It is to be noted that this modification is capable of being attached to an ordinary household knife either by glue, the tension of the manufacturing material, or other suitable means. By so doing, the second cutting edge so provided will perform in the same manner on a muffin as illustrated in Fig. 2 as would other modifications actually incorporated into the knife blade itself.

There has been described what is believed to be the best embodiment of this invention. It is not wished, however, to be confined to the specific embodiment shown. Many modifications of these embodiments may be made by one skilled in the art without departing from the spirit of this invention.

What is claimed is:

1. A knife adapted to cut English muffins comprising an elongated blade, a handle attached to one end of said blade, a first cutting edge along the bottom of said blade, and a second cutting edge comprising a series of projections extending laterally along the top edge of said blade, said blade being of slight, substantially uniform thickness between said edges to permit said first cutting edge to slice through a muffin to expose an interior portion of the muffin and to permit through-cutting of the muffin by said blade, said second cutting edge cooperating with said first cutting edge whereby the interior portion of the muffin exposed by said first cutting edge is roughened by said second cutting edge.

2. A knife according to claim 1 wherein said lateral projections extend alternately to one side and the other of said blade.

3. A knife as in claim 1 wherein said projections are substantially rectangular in shape and are integrally connected so as to extend from the top edge of said blade.

4. A knife as in claim 1 wherein said projections are substantially triangular.

5. A knife according to claim 1 wherein said projections are formed by slitting the upper edge of said knife and bending the areas of said blade between said slits laterally.

References Cited in the file of this patent

UNITED STATES PATENTS

| | | |
|---|---|---|
| 1,993,689 | Stark | Mar. 5, 1935 |
| 2,081,011 | Lautmann | May 18, 1937 |
| 2,588,579 | Schneider | Mar. 11, 1952 |

FOREIGN PATENTS

| | | |
|---|---|---|
| 30,287 | Sweden | Feb. 11, 1911 |